Jan. 5, 1954 H. T. AVERY 2,665,070

BINARY-OCTAL-DECIMAL COMPUTER CALCULATING MACHINE

Filed Nov. 16, 1950 6 Sheets-Sheet 1

INVENTOR
Harold T. Avery
BY
Howard M. Dustin
AGENT

Jan. 5, 1954 H. T. AVERY 2,665,070

BINARY-OCTAL-DECIMAL COMPUTER CALCULATING MACHINE

Filed Nov. 16, 1950

6 Sheets-Sheet 2

INVENTOR

Harold T. Avery

BY

Howard N. Dustin.

AGENT

Jan. 5, 1954 H. T. AVERY 2,665,070
BINARY-OCTAL-DECIMAL COMPUTER CALCULATING MACHINE
Filed Nov. 16, 1950 6 Sheets-Sheet 3
FIG. 3.
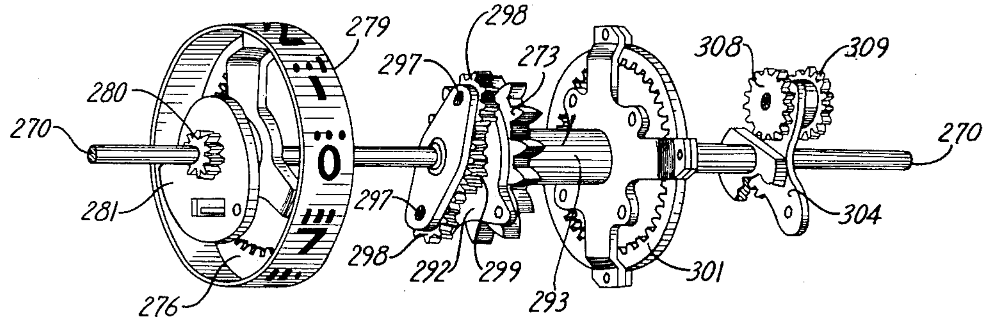
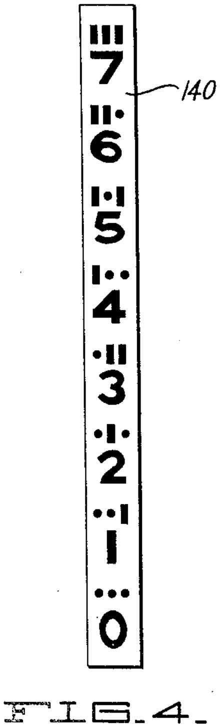
FIG. 4.
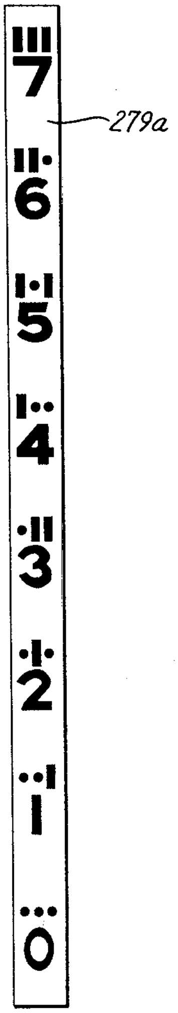
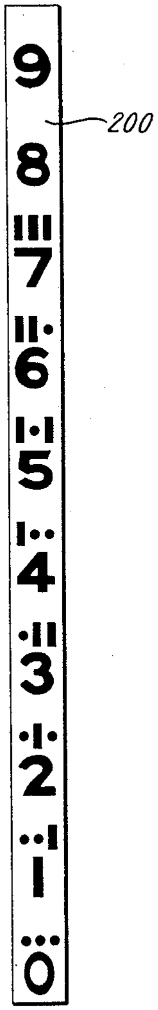
FIG. 5. FIG. 6.
INVENTOR
Harold T. Avery
BY
Howard M. Dustin
AGENT

BINARY-OCTAL-DECIMAL COMPUTER CALCULATING MACHINE

Filed Nov. 16, 1950 6 Sheets-Sheet 4

INVENTOR
Harold T. Avery
BY
Howard M. Dustin
AGENT

BINARY-OCTAL-DECIMAL COMPUTER CALCULATING MACHINE

Filed Nov. 16, 1950 6 Sheets-Sheet 5

INVENTOR
Harold T. Avery
BY
Howard M. Dustin
AGENT

BINARY-OCTAL-DECIMAL COMPUTER CALCULATING MACHINE

Filed Nov. 16, 1950 6 Sheets-Sheet 6

INVENTOR
Harold T. Avery
BY
Howard M. Dustin
AGENT

Patented Jan. 5, 1954 2,665,070

UNITED STATES PATENT OFFICE 2,665,070

BINARY-OCTAL-DECIMAL COMPUTER CALCULATING MACHINE

Harold T. Avery, Oakland, Calif., assignor to Marchant Calculators, Inc., a corporation of California Application November 16, 1950, Serial No. 196,047

6 Claims. (Cl. 235—79)

The present invention relates to calculating machines of the type known as desk calculators in contrast with the large scale high-speed electronic sequence calculators, and particularly concerns desk calculators in which binary and/or octal values may be entered and which perform calculations with such values to display results which may be read directly in the binary and/or octal system.

So far as known, the utility of a desk type binary-octal calculator, stems principally from the large scale electronic calculators which must be programmed and set up for hundreds and many times thousands of sequential calculations during a single program. Since most of the large scale calculators operate in the binary system, a large part of the programming must be done in the binary system. Heretofore, binary calculations incident to programming have been done by paper and pencil, and it has been found that by the long hand method on paper, twenty minutes or more are required to perform a single multiplication involving a thirty digit binary multiplicand and multiplier; whereas, the machine of the present invention requires less than six seconds to perform a binary multiplication problem of the same magnitude.

Other uses of the desk type binary-octal calculator in connection with the large scale machines are too numerous to mention in detail, but as examples of a few of the many uses, it may be noted that during their construction, the large machines must undergo extensive checking by independent calculations mostly in the binary system, and when the machines are put into use it frequently becomes necessary during various stages of the program of sequential calculations to enter binary factors, all requiring many independent calculations of binary numbers which can be done on the machine of the present invention at a great saving of time.

The average office employee is not familiar with the octal and binary systems of notation, therefore skilled mathematicians have heretofore been required to perform the preliminary and independent calculations incident to the programming and checking of the above-mentioned large scale calculators. The machine of the present invention, on the other hand, makes it possible for the average office employee, exercising no more skill than would be required to operate any commercial desk calculator, to perform the bulk of such calculations, thus relieving the mathematicians for more advantageous use of their time.

It is therefore a principal object of the present invention to provide a calculating machine in which the entry keys and accumulator register numeral wheels which bear indicia expressed in the binary system of numeration, and to interpose between the entry keys and the accumulator register, a calculating mechanism that is operable in the octal system.

It is a further object in the attainment of the principal object of the invention to register the results in both the binary and octal systems.

It is a further object in the attainment of the principal object to enter either binary or octal values into the machine.

Another object is to display in the counter register of a calculating machine values numerated either in the binary, octal or decimal system.

Another object is to enable entry into a calculating machine of a multiplier factor in either the binary, octal or decimal system of numeration.

Still another object is to selectively condition the division mechanism of a calculating machine, by a single manual stroke, to start and then to stop the division operation after quotient completion in each of a plurality of orders.

Other objects and advantages of the present invention will become apparent from the following principle and the detailed description of the invention with reference to the accompanying drawings in which:

Fig. 3 is an exploded projection of the "eights" carry mechanism for the numeral wheels of the accumulator register.

Fig. 4 is a development of a factor indicating numeral wheel.

Fig. 5 is a development of a numeral wheel in the accumulator register.

Fig. 6 is a development of a numeral wheel in the counter register.

*General description*

Figure 1:
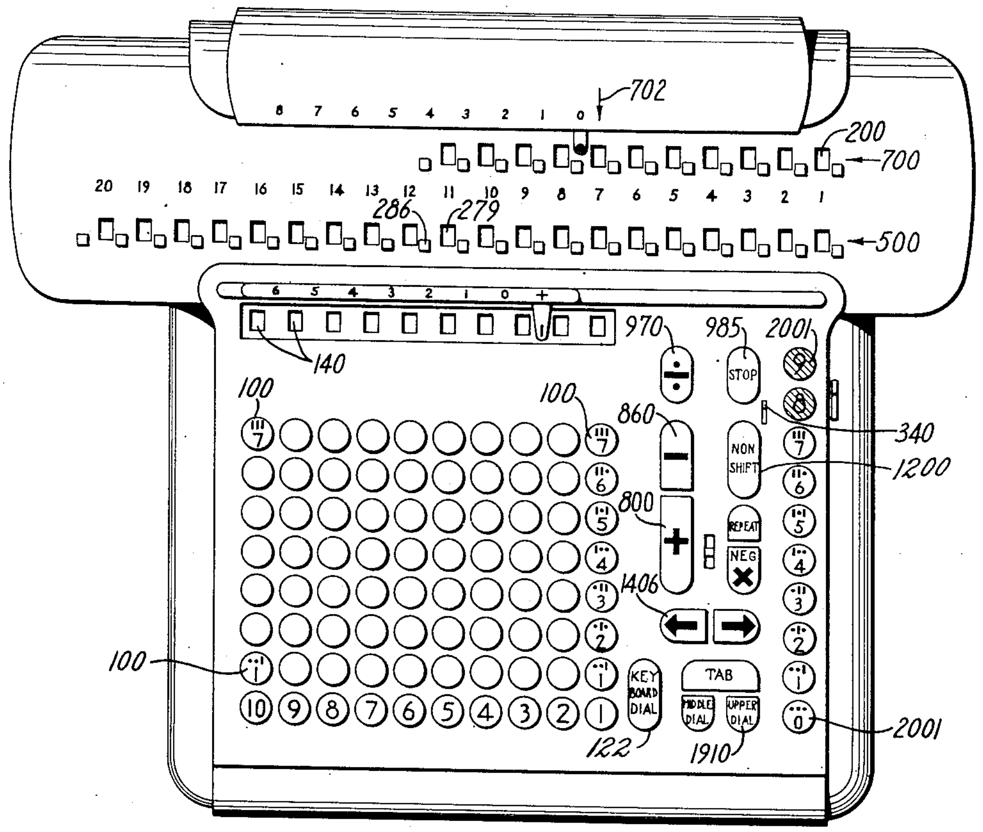
Fig. 1 is an exterior plan view of the calculating machine embodying the present invention.

The binary system of counting, i. e., that system of counting based upon radix 2, includes only two numbers, "0" and "1," and involves a carry over from a lower order to its adjacent higher order every time two units are accumulated in the lower order. The octal system of counting, based upon radix 8, includes the numbers "0" and "1–7" and involves a carry over when eight units are accumulated in a given order. Since the value of $2^3$ is equal to 8 there is a definite and useful relationship between the binary and octal systems of counting. The table below shows the binary digits "0" and "1" arranged in eight groups of three digits each, representing the binary equivalents of the octal digits "0" to "7."

| Binary triples | Octal digits |
|---|---|
| 000 | 0 |
| 001 | 1 |
| 010 | 2 |
| 011 | 3 |
| 100 | 4 |
| 101 | 5 |
| 110 | 6 |
| 111 | 7 |

The above relationship between the binary and octal systems of numeration is well known and is used as a basis for graduating the register numeral wheels and entry keys of the calculating machine disclosed hereinafter. The present machine, however, operates in the octal system, making it possible to obtain the sum or difference of two numbers, and the product or quotient of two factors, one of which two factors or numbers may be in the binary system and the other in the octal system without first transposing the binary number to its octal equivalent or vice versa.

A multi-digit decimal number, based upon the radix 10 can be converted into its octal or binary equivalent in a number of ways which, for the most part, are slow and laborious, but by means of the machine of the present invention, the conversion can be performed easily and quickly by operating the accumulator register in the octal system and preferably by multiplying the octal equivalent of the power of ten representative of each decimal order times the coefficient of the respective decimal order, as will appear in more detail hereinafter; and furthermore, an octal or binary number can be converted to its decimal equivalent preferably by dividing an octal number or the octal equivalent of the binary number that is to be converted, by the largest octal equivalent (of the various powers of ten) that is contained in said octal number. By operating the dividend register in the octal system and the quotient register in the decimal system during such division operation, the decimal equivalent of the binary or octal number appears in the quotient register as will also be described in more detail hereinafter.

The present invention is therefore based upon the principle of graduating both the entry keys and the accumulator register in the binary system of numeration, and operating the calculating mechanism in the octal system.

It is desirable for the purposes of utility and flexibility of the machine of the present invention to also delineate octal numbers on the entry keys and the register numeral wheels so that values may be entered and the results registered in the octal system as well as in the binary system.

It is advantageous to additionally provide a counter register which is graduated in the octal and binary systems and also in the decimal system so that the same register may be used to display in one system of numeration results of a division calculation, and may also display in another such system a factor of a multiplication problem.

It is further advantageous to graduate a series of multiplier entry keys in the octal and decimal systems so that a binary or octal value may be multiplied by an octal, or alternatively a decimal number.

In order to illustrate the extent to which the advantages may be realized by application of the above principle, the present invention is disclosed as embodied in what is known as a monophase calculating machine having proportional gear actuators and crawl carry registering mechanism which operate simultaneously to effect digitation and carry in a single phase of operation. While the present disclosure illustrates the preferred mode of applying the principle outlined above, it will be understood that the invention is applicable as well to any desk type calculator including those known as polyphase machines usually having intermittent actuators and sequential carry mechanisms which effect digitation during one phase and carry during a second phase of operation.

Figure 10:
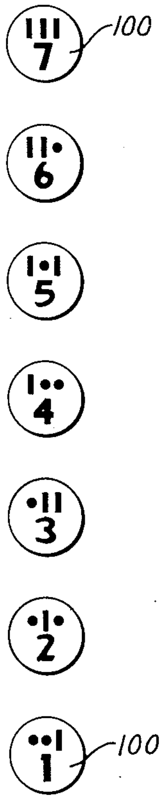
Fig. 10 is an enlarged plan view of one order of the numeral keyboard showing the binary and octal numeral designations on the respective keytops.

The machine of the present invention has a plurality of ordinally arranged value entry keys 100 (Fig. 1), an accumulator register 500, and a counter register 700. Values are introduced into the machine by depressing selected ones of the numeral keys 100, each bearing a respective octal figure and also a corresponding binary designation and, as shown in Fig. 10, the binary figure "0" is represented by a dot which, together with the natural narrowness of the 1, makes it possible to show three binary figures on the keys and numeral wheels. After a binary or octal value is entered into the keyboard it may be transferred into the register 500 (Fig. 1) by depression of a plus key 800, whereas subtractions are performed under the control of the minus key 860.

In the performance of multiplication, the multiplicand is entered into the keyboard 100 and the multiplier is then entered by depressing the multiplier control keys 2001 in the same order as one would write the multiplier value on paper. Each multiplier key causes entry of the multiplicand into the register 500 a number of times corresponding to the value of the key depressed. At the end of the multiplication the product appears in register 500 and the multiplier value appears in register 700.

Figure 11:
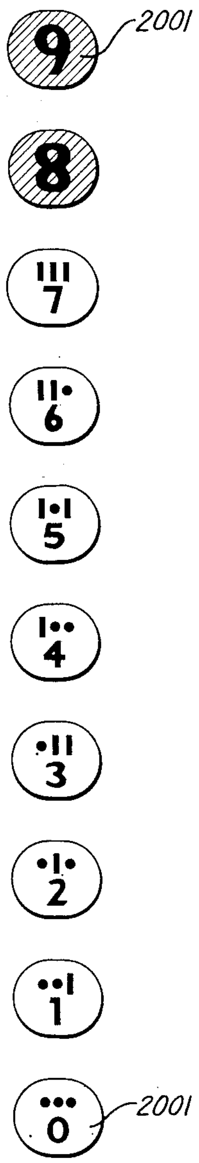
Fig. 11 is an enlarged plan view of the multiplier control keys showing the binary, octal and decimal numeral designations on the respective keytops.

The "0" to "7" multiplier keys 2001 (Fig. 11) each bear respective binary numbers and their corresponding octal figure while the "8" and "9" keys bear only the respective decimal figures 8 and 9 for a purpose which is explained hereinafter. Suffice it to say that only the "0" to "7" keys are used in multiplication by binary and octal figures.

In performing a division problem the dividend is entered into register 500 by the keys 100 and the depression of the plus bar 800 as previously explained. The divisor is then entered into the keyboard, and upon depression of the divide key 970, automatic division operations are initiated at the end of which the quotient appears in register 700 while the remainder, if any, appears in register 500.

*Value entering mechanism*

A value is entered into the machine by depressing the numeral keys 100. An indicator dial 140 (Figs. 1 and 2) is associated with each ordinal row of keys to show the value selected in a respective row. The depression of a value entry key 100 moves a selection bar 120 rearwardly of the machine by selected amounts and thereby conditions an associated ordinal actuator for subsequently driving an aligned numeral wheel 279 by an amount proportional to the value of the key depressed. Each selection bar 120 is pivotally supported from the framework of the machine by a pair of parallel links 128 and 129 and seven V-shaped notches 130 are cut in the bar 120, each notch terminating in a U-shaped notch 131 at the bottom of the V. The number "1" notch 131 is laterally spaced one increment from the corresponding keystem 103 of the "1" key while the number "2" notch 131 is spaced two increments from the keystem 103 of the "2" key. The space between the notches 131 and their respective keystems becomes progressively greater from the lower to the higher numbered keys with the number "7" notch 131 lying seven increments from the "7" keystem 103. When the number "2" key is depressed, for example, its keystem 103 contacts the rightmost shoulder of the #7 V-shaped notch 131 and cams the selection bar 120 seven increments to the right at which time the keystem enters the U-shaped notch 131 to hold the selection bar in its set position. A lock bar 117, of conventional construction, is effective to lock the "7" key 100 in its depressed position and thereby hold the selection bar 120 in its set position.

The selection bar 120 adjusts an associated ordinal actuating mechanism in accordance with the value of the key depressed and for this purpose has a notch 121 in its rightmost end which embraces a pin 163. The latter is carried by a lever 132 freely mounted on a stationary pivot 137, and the rightward movement of the selection bar 120 therefore rocks lever 132 counterclockwise a proportional amount. The lower end of lever 132 carries a gear segment 139 which meshes with a gear 151 freely mounted on a shaft 159. The hub of gear 151 carries a plurality of actuator drive selection cams 152 which correspond in function and have the same reference numerals as similar cams shown in the Patent Number 2,271,240, issued January 27, 1942. A setting clutch (not shown) is described in the last mentioned patent which is engaged for one cycle of operation prior to each numeral wheel actuating operation, and during each setting clutch cycle the respective positions of the selection cams 152 determine the selective engagement of various gears in a proportional gear mechanism generally indicated at 170, and also causes engagement of gear 271 with gear 171, thus completing the gear train from the proportional gearing 170 to the numeral wheel gear 273. Following the setting clutch operation, a "main" clutch drives the above mentioned proportional gear mechanism 170 to cause advance of the digital actuator drive gear 171, and the numeral wheel 279 in accordance with the value of the selection made in that order.

The counterclockwise rocking of the previously mentioned lever 132 by a selected amount is also effective through a segment 138, formed on the upper end thereof, to rotate a gear 145 by a proportional amount. Gear 145 is fixed to the indicator dial 140 (Figs. 2 and 4) which has octal and corresponding binary figures delineated on its periphery. The octal and binary figures appear through a window 178 (Fig. 2) in the machine cover 179 and show the value selected in a respective order.

For a more complete understanding of the numeral wheel actuation mechanism which is controlled by the previously mentioned selection control cams 152, reference is made to the last mentioned Patent Number 2,271,240.

*Accumulator register 500*

Figure 2:
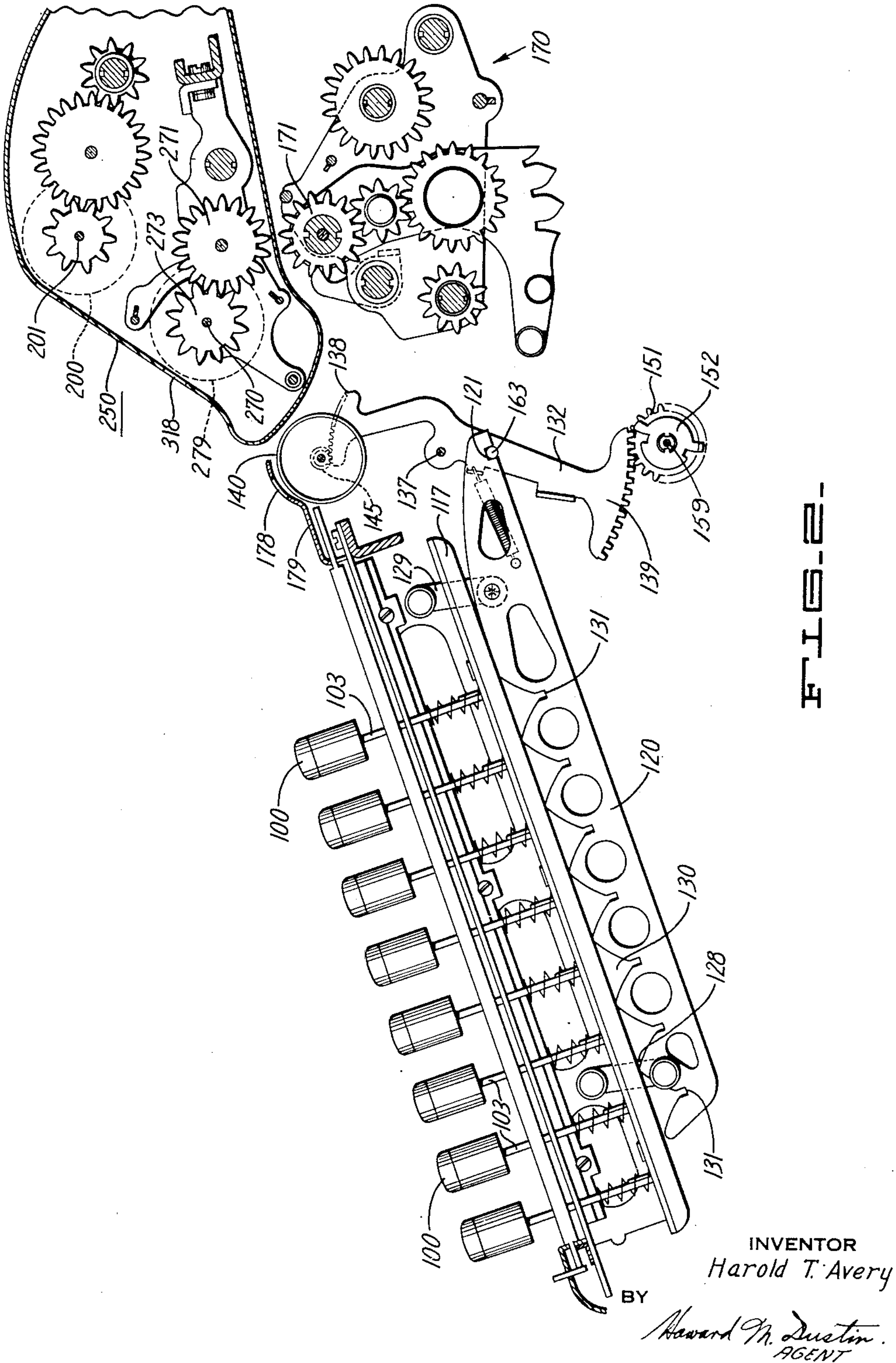
Fig. 2 is a right side view, partly in section, showing one ordinal row of the numeral keyboard, its associated value entering mechanism, and the actuating and registering mechanism.

The accumulator register 500 includes a series of numeral wheels 279 (Fig. 2) mounted in ordinally spaced relationship for free rotation on a transverse shaft 270, suitably fixed within a carriage 250, which is mounted for transverse shifting movement so as to associate various groups of numeral wheels with the ordinal actuator gears 171 (Fig. 2).

Each numeral wheel of register 500 includes a dial shell 279*a*, a development of which is shown in Fig. 5. The periphery of each dial shell bears both the octal figures 0 . . . 7 and their corresponding binary numbers as shown, and the arrangement is such that both the octal and binary registrations appear through a window 318 (Fig. 2) of the carriage cover when the numeral wheels come to rest at the end of numeral wheel actuation.

On the basis of the octal system of numeration discussed hereinbefore, the passage of a numeral wheel from 7 to 0 causes a carry of "1" into the next higher order. For this purpose the numeral wheels 279 (Fig. 3) are interconnected from order to order by a differential gear train which transmits a proportional drive from each lower order numeral wheel to its adjacent higher order numeral wheel simultaneous with the actuating operation.

This type of carry mechanism is known in the art as a "crawl" carry mechanism and the registers in which such mechanisms are employed are commonly referred to as "crawl" carry registers. A register of this general type is shown in the Patent Number 2,222,164, issued November 19, 1940, whereby a carry of "1" into a numeral wheel is completed each time its adjacent lower order numeral wheel passes from 9 to 0. In the present case, the various gears of the differential gear train shown in the last mentioned patent have been changed with respect to the ratios between the gears so as to produce a carry movement in the ratio of 8:1 instead of 10:1.

At the beginning of a calculating operation the previously mentioned setting clutch is effective to cause a "dipping" of the carriage in the manner described in the last mentioned patent to engage the idler gear 271 (Fig. 2) with gear 171, and such engagement between the gears is maintained throughout the actuating operation. Gear 271 meshes with the previously mentioned numeral wheel gear 273 (Fig. 3) which is the digital entry gear of the differential and is freely mounted on a hub 293 of a sun gear 299 and an integral ring gear 301. A plate 292 is fixed to gear 273 and also is freely rotatable on the hub 293. The plate carries a pair of pins 297 upon which planet gears 298 are freely mounted. The planet gears mesh with the sun gear 299 and also with an internal ring gear 276 formed as an integral part of the numeral wheel 279.

The sun gear 299 and its integral ring gear 301 form a part of the tens carry gearing from the next lower order and are connected to the next lower order numeral wheel by means of an idler gear 308 enmeshed with the ring gear 301 and which idler 308 is integral with a gear 309 meshing with gear 280 carried by the next lower order numeral wheel.

With the sun gear 299 held fixed, as is the case in the lowest order of the register, the clockwise rotation of gear 273 (Fig. 3), and the supporting pins 297 for the planet gears 298, is effective to revolve the planet gears in a clockwise direction around the sun gear 299 and advance the ring gear 276 and the numeral wheel a proportionate amount in a clockwise direction.

In the machine of the present invention the digital entry gear 273 is advanced clockwise one tooth for each octal digit which is entered into its respective ordinal numeral wheel and, by way of illustration, the differential gears for causing such entry are as follows: gear 273 has 12 teeth, the sun gear 299 has 20 teeth, the planet gears 298 have 10 teeth each, and the internal ring gear 276 has 40 teeth.

Assuming that a "6" is to be entered into a numeral wheel 279, then gear 273 which has 12 teeth is advanced 6 teeth or 0.5 a revolution. Correspondingly, the centers 297 for the planet gears are driven a half a revolution around shaft 270, and according to well known principles, the planet gears revolve about the sun gear 299 and advances the forty tooth ring gear 276 by thirty teeth or 6/8 of a revolution. The numeral wheel is therefore advanced to display a "6."

At the same time a "6" is introduced into the numeral wheel 279, the next higher order numeral wheel is advanced by one-eighth this amount, the drive from one numeral wheel to the next being introduced through gear 280 integral with the numeral wheel 279. Gear 280 meshes with the previously mentioned gear 309 which is integral with the planet gear 308, and which gears are supported on a normally fixed element 304. Planet 308 meshes with the internal ring gear 301 which is integral through the hub 293 with the next higher order sun gear 299.

The gear 280 has 10 teeth while the ring gear 301 has 40 teeth; therefore, 360° of rotation of the gear 280 is effective through the idler planetary gears 309—308 to rotate the forty tooth ring gear 301 by 10 teeth, or by 1/4 of a revolution. Since the ring gear 301 is integral with the sun gear 299 of the next higher order, the sun gear 299 is also rotated 1/4 of a revolution. Assuming for the moment that there are no digital increments of drive being introduced through gear 273 of the respective higher order and that the centers of the planetary gears 298 are therefore fixed, then 1/4 revolution of the 20 tooth sun gear 299 is effective to advance the 40 tooth ring gear 276 and the numeral wheel 279 by five teeth or by 1/8 of a revolution. This is the correct proportion of drive that should be transmitted from a lower order numeral wheel to its adjacent higher order numeral wheel when the octal or the present binary system of counting is employed.

Obviously if a "6" is introduced into the lower order, as in the previously described example, then the next higher order numeral wheel will be advanced 6/8 of a digit.

Digital and carry increments of drive are introduced simultaneously through the differential gearing described above, and therefore at the end of the actuating operation, the numeral wheels that have been advanced by partial carry increments will not stand aligned at positions of full digital display. An aligning mechanism of the type shown in the previously mentioned Patent Number 2,222,164 is therefore provided which is effective at the end of each ordinal actuating operation to back out the partial carry increments of drive transmitted between adjacent numeral wheels and thereby bring the numeral wheels to positions of full digital display. Briefly, this aligning mechanism includes a graduated member 281 (Fig. 3) in the form of a snail cam which is carried by each numeral wheel 279. An associated sensing lever (not shown but which is described in the last mentioned patent) is brought into play at the conclusion of each numeral wheel actuation to contact the periphery of the snail cam, and such contact occurs as the carriage is brought from its "dipped" to its initial raised position.

Since the snail cam is graduated from its highest to its lowest periphery to correspond to the values 0 . . . 7, the amount of movement required to cause the contact of the sensing lever with the snail cam is indicative of the value standing in the numeral wheel. This movement of the sensing lever is transmitted to the planetary carrier 304 (Fig. 3) of the next higher order and rocks the carrier a proportionate amount in a clockwise direction to cause clockwise movement of the ring gear 301 and the sun gear 299. This rotates the higher order numeral wheel 279 in a subtractive counterclockwise direction by the correct amount required to bring the same to a position of full digital display.

From the foregoing description of the register 500 it is seen that the numeral wheels are advanced both by digital and carry increments of drive during the actuating operation and that the differential gearing between the numeral wheels is effective to advance each higher order numeral wheel by one-eighth of the total advance of its adjacent lower order numeral wheel. At the end of each ordinal calculation the numeral wheels are brought to positions of full digital display.

*Counter register*

The counter register 700 (Fig. 1) registers the multiplier and the quotient respectively in problems of multiplication and division, and is of the same type as that shown in the Patent Number 2,462,690, issued February 22, 1949. This register comprises a plurality of ordinally spaced numeral wheels 200 (Fig. 2) which are mounted for free rotation on a transverse shaft 201 fixed in the carriage 250. The numeral wheels are adapted to show binary, octal, and decimal figures. For this purpose each numeral wheel bears the numeral figures as seen in the development of the counter numeral wheel shown in Fig. 6. The octal figures 0 . . . 7 and their corresponding binary numbers occupy eight of the ten figure places while the decimal figures 8 and 9 occupy the remaining two places. The latter two figures are in contrasting color but otherwise have the same outline as the octal figures.

In most cases the machine will be called upon to multiply or divide one octal (or binary) value by another octal (or binary) value in which case only the octal figures 0 . . . 7 and the corresponding binary designations will appear in the counter register. In some cases, however, the machine is used to convert decimal values to their equivalent octal (or binary values), or to convert octal (and binary values) to decimal values. When decimal values are converted into the octal or binary system, the result appears in the accumulator register 500 and the decimal value which is converted appears in the counter register 700. When an octal or binary value is converted into a decimal value, the resulting decimal value appears in the counter register 700. In any event, the figures which appear in the counter register during a conversion problem are read as a decimal value, as is fully explained hereinafter.

The counter numeral wheels are equipped with a carry mechanism which is adapted to carry tens instead of eights since octal values are not intended to be added together in the counter register. Since the carry mechanism of the counter register is the same as that disclosed in the above mentioned Patent No. 2,462,690, reference to said patent may be had for a more detailed description of such counter and tens carry mechanism.

*Multiplier mechanism*

Figure 7:
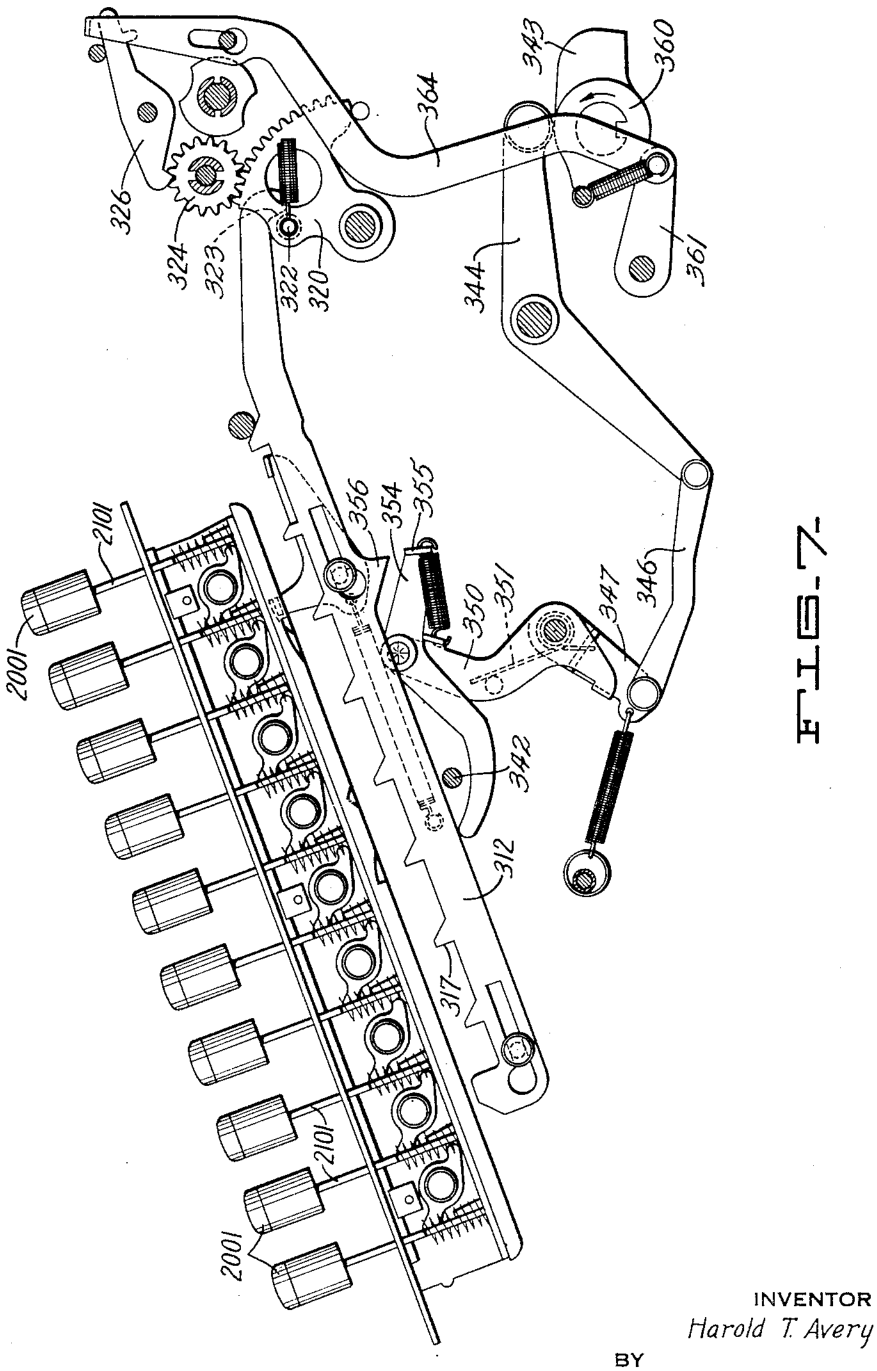
Fig. 7 is a right side view showing the multiplier control keys and related mechanisms.

The multiplier mechanism of the present machine is the same as that shown in the Patent No. 2,400,244 issued May 16, 1946, and includes a row of ten multiplier control keys 2001 (Figs. 1 and 7). Each key 2001 may be depressed to cause the calculating machine to operate through a number of cycles of numeral wheel actuation corresponding to the value of the multiplier key depressed. At the end of each ordinal multiplying operation the carriage 250 is automatically shifted one order to the left.

Figure 8:
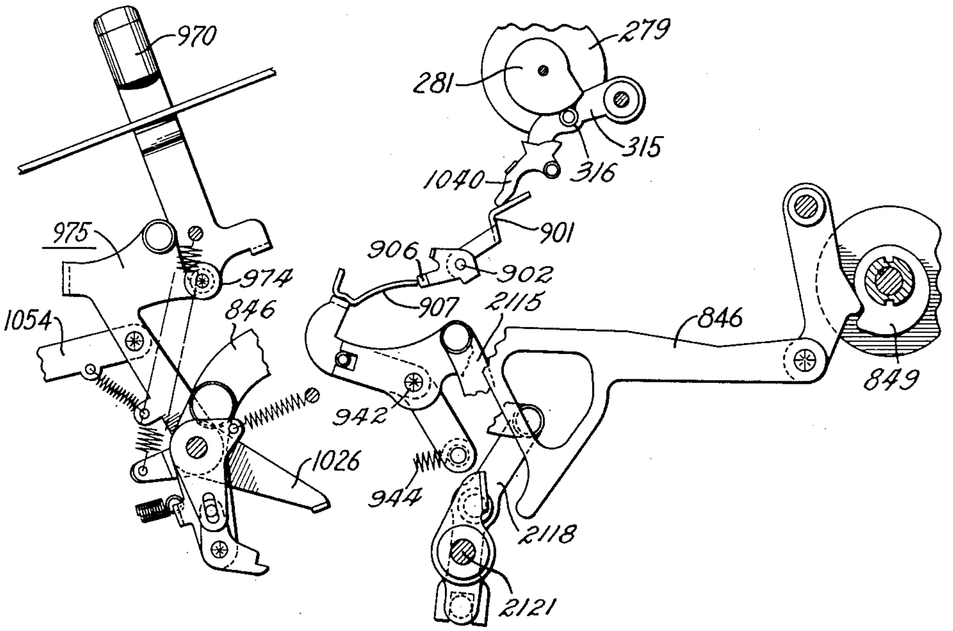
Fig. 8 is a right side view showing the divide key and associated mechanisms.
Figure 9:
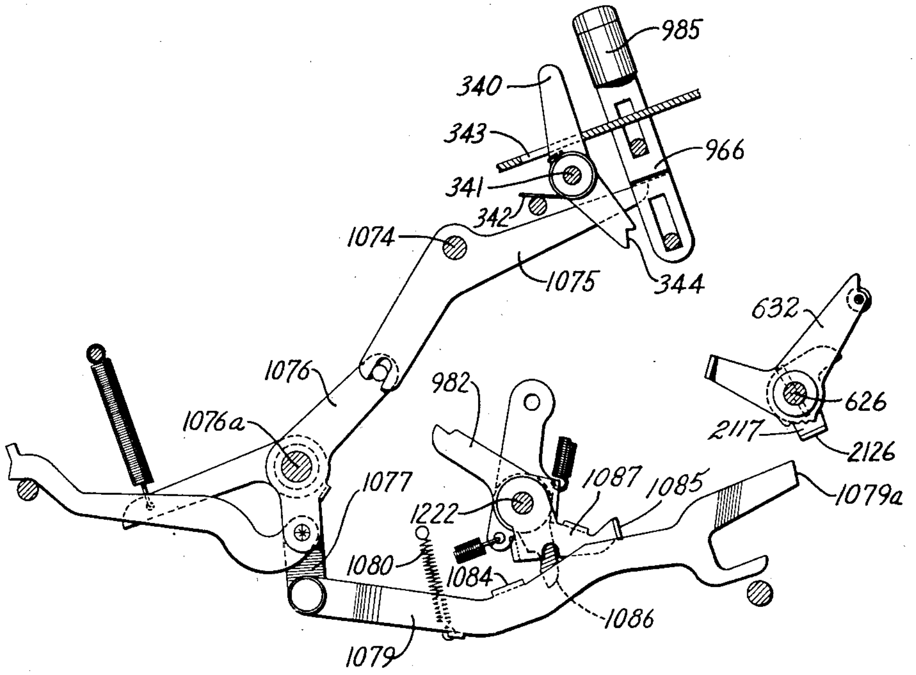
Fig. 9 is a right side view showing the division stop key and related mechanisms.

The first eight keys 2001 (Fig. 11) bear the octal figures 0 . . . 7 and the corresponding binary designations while the last two keys bear only the decimal figures 8 and 9. Since the numeral designations in the octal and decimal systems are the same for the first seven integers, the keys 0 . . . 7 are used in multiplying in the decimal system as well as in the octal system.

The depression of any multiplier key 2001 (Fig. 7) is effective to do two things: (1) to initiate the operation of the setting clutch which adjusts the numeral wheel actuating mechanism and then initiates the operation of the main clutch, and (2) to condition a mechanism for stopping the main clutch at the end of a selected number of cycles of actuation. For the purpose of the present description, it is sufficient to point out that the bottom of the multiplier keystems 2101 cooperate with a differential slide 312 for controlling the above mentioned number of cycles of actuation, and each key is effective to depress a starting bar to initiate the operation of the setting clutch which, in turn, causes engagement of the main clutch. Prior to such engagement of the main clutch, a setting clutch cam 343 provides the power for moving the differentially settable bar 312 toward the right until it is stopped by the depressed key. Cam 343 rocks a follower lever 344 counterclockwise thus moving link 346 toward the right. Link 346 is connected to an assembly comprising arm 347, lever 350 and a torsion spring 351 by means of which lever 347 rocks lever 350 counterclockwise. The latter carries a lever 354 having an ear 355 normally lying below a lug 356 on the differentially settable bar 312. The pin 342 is operable in response to depression of the multiplier keys "1" to "9" to rock the lever 354 counterclockwise, as described in the last mentioned Patent No. 2,400,244, thus moving ear 355 behind lug 356 so that the previously mentioned counterclockwise movement of lever 350 causes ear 355 to move the selection bar 312 toward the left until stopped by a depressed multiplier keystem 2101. The selection bar 312 has a hook 323 on its rightmost end which engages a stud 322 on a sector gear 320 and rocks the same counterclockwise a number of teeth corresponding to the value of the key depressed. Sector 320 meshes with and drives a selection gear 324 a similar number of teeth. Meanwhile, the setting clutch cam 360 rocks a follower 361 clockwise and through link 364 withdraws a pawl 326 from engagement with gear 324 to permit the above mentioned rotation of the same. Pawl 326 normally is urged counterclockwise (by means not shown) into engagement with gear 324.

From the foregoing description it is seen that the selector gear 324 is rotated a number of teeth corresponding to the value of the multiplier key depressed. Means (not shown) are operable by the setting clutch to thereafter cause engagement of the main clutch, and during each cycle of operation of the main clutch, mechanisms, described in the last mentioned patent, return the selector gear 324, step by step, one tooth for each cycle of operation, back to its initial position, whereupon the main clutch is disengaged. In this manner the depression of the multiplier keys controls the differential setting of the multiplier selection bar 312, which in turn determines the number of cycles of operation of the main clutch.

*Division mechanism*

The division mechanism of the machine embodying the present invention is of the same type disclosed in the Patent No. 2,211,736, issued August 13, 1940. The division mechanism of that patent is shown in its improved form in Patent No. 2,271,240, issued January 27, 1942, to which reference may be had for the parts of the division mechanism not specifically described herein.

In performing division operations in the present machine, a binary or octal dividend value is entered into the keyboard 100 (Fig. 1). Depression of the plus key 800 transfers the dividend to the register 500 and automatically clears the keyboard, after which the counter register is reset to zero by depressing the upper dial clear key 1910. An octal or binary divisor value is then entered into the keyboard and the divide key 970 is depressed, which initiates operation of the division mechanism. Briefly, the depression of the divide key 970 (Fig. 8) moves a roller 974 carried thereby from restraining engagement with a division initiating member 975. The latter then rocks clockwise in response to a spring (not shown) and performs several functions described in the previously mentioned Patent No. 2,271,240, including initiation of actuating operations in a subtractive direction. A lever 1026, integral with the member 975, also rocks clockwise and, by means not shown, permits continuous operation of the main clutch and repeated cycles of subtractive actuation until the value standing in the dividend register is reduced to substantially the value of the divisor. For this purpose the present machine employs a "comparison" type of division mechanism operable jointly under the control of the dividend register and the divisor values set in the keyboard. This comparison mechanism includes a snail cam 281 (Fig. 8) carried by the numeral wheel 279 of the dividend register, which snail cam together with a cooperating follower lever 315 therefor forms a mechanical representation of the value standing in the dividend register. The follower lever 315 carries a sensing finger 1040 which for present purposes may be considered integral therewith. During subtractive rotation of the numeral wheels the snail cam is rotated in a clockwise direction, thereby moving the follower 315 in a counterclockwise direction, and as described in the last mentioned patent, the sensing finger 1040 at such time depresses a sensing shelf 901 in a clockwise direction about its pivot 902. The location of the pivot 902 may vary somewhat from the position shown in Fig. 8 according to the value of the divisor, thereby varying the relationship between the sensing shelf 901 and the sensing finger 1040 in accordance with the divisor and the dividend values. Assuming, however, that the position of the pivot 902 is such as that shown in Fig. 8, then, as the sensing shelf 901 is depressed, a tail 906 on the leftward end of the sensing shelf is raised out of restraining relationship with a division gate 907. During division operations the gate 907 is urged in a clockwise direction about a pivot 942 by a spring 944, and when the tail 906 is rocked out of restraining engagement with the gate 907, the latter rocks clockwise to the extent necessary to move a link 2115 downwardly and through a connecting lever 2118 and associated mechanisms to rock the shaft 2121 in a clockwise direction. This stops subtractive actuation and, through mechanisms described in the last mentioned patent, returns the division control member 975 counterclockwise to substantially its initial position shown, at which time a linkage 1054 initiates operation of a mechanism for causing an optional plus stroke in case the dividend register has been overdrafted during the previous subtractive actuation. The return of the division control member 975, as mentioned above, is effected by means of a cam 849 and a follower therefor having a link connection 846 with an extension of said member 975. Cam 849 is rotated in a counterclockwise direction by a "restore" clutch forming a portion of the division program mechanism which is set in operation by the depression of the divide key. The return of the division control member 975 to its initial position moves a link 1054 toward the left whereupon the previously mentioned optional plus stroke mechanism is set in operation and, if the machine has overdrafted, a corrective plus stroke will be taken in the usual manner, followed by a one order shift of the dividend carriage toward the left. If no overdraft has occurred, then no corrective plus stroke is taken and the machine merely shifts toward the left as above mentioned. At the conclusion of the shift operation the division control member 975 is released, whereupon it again rocks clockwise to initiate division operations in the next order in much the same manner as described in connection with the depression of the divide key. The division operation proceeds order by order until the capacity of the machine is reached, at which time the machine automatically stops and the quotient, in both octal and binary figures, is shown in the register 700.

A division stop key 985 (Figs. 1 and 9), described in the last mentioned patents, may be depressed during any ordinal division operation to stop the division mechanism after completion of the quotient in that order. Also, the key may be depressed twice to immediately stop the division operation without quotient completion. The stop key 985 (Fig. 9) has an offset 966 which overlies a lever 1075 pivotally mounted on shaft 1074. The left end of lever 1075 has a bifurcated tip which embraces a pin fixed to an arm 1076. Depression of key 985 therefore rocks arm 1076 counterclockwise and which arm, through a common hub 1076*a* rocks a bellcrank 1077 counterclockwise. Bellcrank 1077 is pivotally connected to a link 1079 and moves the link toward the right as viewed in Fig. 9. At this time an ear 1084 on the link rocks an arm 1086 of a latch member 982 counterclockwise about shaft 1222, and as described in the Patent No. 2,271,240, releases the divide key 970 from its depressed position after which operation of the division mechanism is automatically stopped at the end of quotient completion in the current order by mechanism fully described in said patent.

When it is desired to stop division operations without waiting for quotient completion, the stop key 985 is depressed twice and the machine stops at the end of the current cycle of numeral wheel actuation. The mechanism for causing such immediate stopping includes a lever 1087 which is pivoted on the shaft 1222 adjacent the division key latch 982. Lever 1087 has an ear 1085 overlying the link 1079 and normally limits the upward movement of the link 1079 to the position shown. When the division stop key 985 is depressed the first time, however, the latch 982 and lever 1087 are moved counterclockwise from the position shown and are held in this position by mechanism described in the last mentioned patents. This permits the link 1079 to move upwardly to a position in which the right end 1079*a* of the link lies adjacent an ear 2126 of a lever 2117. Lever 2117 is fixed to a shaft 626 which also carries a latch lever 632. The latter forms a portion of the actuation control mechanism, and the arrangement is such that the second depression of the stop key and the rightward movement of link 1079 rocks levers 2117 and 632 counterclockwise to stop numeral wheel actuation at the end of the current cycle, all as is described in the last mentioned patents.

It should be noted that the stop key 985 may be held in depressed position while the divide key is depressed, in which case the division operation is initiated as usual, but the division operation is terminated upon completion of the quotient in the first order in the same manner as if the stop key were depressed after the divide key was depressed. This is true because the depression of the stop key moves the divide key latch 982 to its release position and prevents the same from locking the divide key in depressed position.

The foregoing description shows how the machine of the present invention operates in the performance of the four fundamental calculations in which binary and/or octal factors are entered into the machine to directly produce a result in the binary or octal system of numeration. In the testing and programming of the large scale electronic calculators mentioned hereinbefore, it is frequently necessary to convert decimal values into their octal or binary equivalent or vice versa. The following description illustrates, by way of example, the operation of the machine of the present invention to effect such conversion.

*Conversion*

Fundamentally, the conversion of a plural order octal or binary number to its decimal equivalent can be performed automatically on the machine of the present invention simply by dividing the given octal or binary number by "1," with the divisor "1" lined up with the units order of the octal dividend. This is made possible by the mechanism described hereinbefore, including particularly the binary-octal entering mechanism and calculating mechanism including differential actuators and carry-over mechanism for the accumulator register which operates in the octal system, in combination with a counter register and tens carry mechanism therefor which operate in the decimal system. By means of this organization, division is performed automatically in the octal system, while the resulting quotient is registered as a decimal number, and as such, is the decimal equivalent of the octal or binary dividend.

Similarly, a decimal number can be converted to its binary or octal equivalent by simply multiplying "1" by the given decimal number, by repeated cycling without carriage shift; whereupon the binary or octal equivalent is registered in the accumulator which, as stated above, operates in the octal system while the multiplier or counter register operates in the decimal system.

More specifically, the multiplication is performed on the present machine by first depressing the non-shift key 1200 (Fig. 1), which prevents an automatic shift in multiplication as disclosed in the previously mentioned Patent No. 2,271,240, and then repeatedly depressing the multiplier keys 2001 until the above mentioned decimal value is registered in the counter register. Obviously, in a "bar" type machine, such multiplication can also be performed by holding the plus bar depressed for a number of cycles corresponding to the decimal number to be converted.

In both of the above conversions, the carriage remains stationary and the results are reached by repeated subtractions in the case of division and by repeated additions in the case of multiplication. Conversion of large numbers would, by this basic method, require more time than is desired; therefore, in cases of large numbers, the short-cut methods described below can be employed in connection with the machine of the present invention.

*Short cut method of converting a decimal number to its octal or binary equivalent*

Briefly, a large decimal number can be converted to its octal or binary equivalent preferably by entering the value of the octal equivalent (shown in the following table) of the corresponding power of ten representative of each digit of the given decimal number, and by multiplying each octal equivalent by the value of each respective decimal digit. The sum of all the products is then the true octal equivalent of the multi-digit decimal number, and this value can be directly read on the numeral wheels of the accumulator register, in either the octal or binary system of numeration.

CONVERSION TABLE

| Column 1<br>Ordinal position of decimal digit to be converted | Column 2<br>Decimal value | Column 3<br>Octal equivalent |
|---|---|---|
| 10th order before dec. point | 1000000000. | 7346545000. |
| 9th order before dec. point | 100000000. | 575360400. |
| 8th order before dec. point | 10000000. | 46113200. |
| 7th order before dec. point | 1000000. | 3641100. |
| 6th order before dec. point | 100000. | 303240. |
| 5th order before dec. point | 10000. | 23420. |
| 4th order before dec. point | 1000. | 1750. |
| 3rd order before dec. point | 100. | 144. |
| 2nd order before dec. point | 10. | 12. |
| 1st order before dec. point | 1. | 1. |
| 1st order after dec. point | .1 | .0 631463146 |
| 2nd order after dec. point | .01 | .00 507534122 |
| 3rd order after dec. point | .001 | .000 406111565 |
| 4th order after dec. point | .0001 | .0000 321556135 |
| 5th order after dec. point | .00001 | .00000 247613261 |
| 6th order after dec. point | .000001 | .000000 206157364 |
| 7th order after dec. point | .0000001 | .0000000 153277452 |
| 8th order after dec. point | .00000001 | .00000000 125714356 |
| 9th order after dec. point | .000000001 | .000000000 104560277 |

The short-cut method of conversion described briefly above can best be illustrated by an example; therefore, assume that a decimal number 35,684.96 is to be converted into an octal or binary value. The first digit of this decimal number is in the 5th or 10,000 column, and the octal equivalent of 10,000 is 23420, shown in column 3. The decimal digit is a "3" representing 30,000 in the decimal system, therefore 23420 is multiplied by "3." This is done by entering 23420 into the five leftmost rows of the keyboard, and with the carriage in its right end position, the "3" multiplier key 2001 is depressed, whereupon the octal product 72460 appears in the register 500. The carriage 250 is then shifted one order to the left in preparation for the next ordinal multiplying operation. The machine of the present invention is equipped with multiplying and shifting mechanisms described in the previously mentioned Patent No. 2,400,244, whereby a one order carriage shifting movement toward the left occurs automatically at the end of each ordinal multiplication. If an automatic shift mechanism were not provided, however, then the shifting operation could be accomplished by a single depression of the left shift key 1406 (Fig. 1).

The second decimal digit "5" is in fourth order before the decimal point, therefore, the octal value 1750 (column 3 of the table) corresponding to decimal value 1000 is entered into the four leftmost orders of the multiplicand keyboard and is multiplied by "5" by depression of the #5 multiplier key 2001. The product of 1750 times 5 is entered into register 500, and the resulting accumulated octal value 104270 stands in the register. The above operations are repeated in each successive order, with the entry of each multiplicand in the leftmost column of the keyboard, and until the products of the several octal values before the decimal point are accumulated. At this stage of the conversion the octal equivalent 105544, of the decimal number before the decimal point, stands in the register. The first decimal digit after the decimal point in the example chosen for illustration is "9." The octal equivalent of .1 is .0631463146, which is entered in the keyboard starting from the extreme left with the first significant digit in the next to the leftmost order, and the "9" multiplier key 2001 is depressed, whereupon the resulting product is added to the preceding accumulated octal value.

The remaining octal fractions shown in column 3 each includes an octal point corresponding to the decimal point in the decimal system, and a number of zeros preceding the first significant digit. The octal point and the zeros immediately following may be disregarded, however, by application of the rule of entering the first significant digit (following the stepped line in column 3) into the next to the leftmost column of the keyboard.

Continuing now with the conversion of the last digit of the decimal number, the octal equivalent of .01 (column 3 of the table) is then entered in accordance with the above rule, and is multiplied by 6, at which time the octal equivalent 105544.75341217234 and also the 47 digit binary equivalent of the decimal number 35,684.96 stand in the register 500.

*Short-cut method of converting an octal or binary number to its decimal equivalent*

The conversion of an octal or binary number into its decimal equivalent by the short-cut method involves a division operation in which a different divisor value in the octal or binary system of numeration is used in each order of division to determine the respective quotient digits in the decimal system. Before the short-cut conversion operation is discussed, a mechanism will be described immediately below which is effective to automatically stop the division operation in each order upon completion of the current quotient digit. The previously mentioned stop key 985 (Fig. 9) may be depressed in each order each time the division key is depressed, but this requires strict attention on the part of the operator, and failure to depress the stop key in any order would permit plural order division operations and destroy the entire calculation.

A latch lever 340 (Fig. 9) is therefore provided which may be moved to its forward position after the stop key is depressed to lock the latter in depressed position to thereby adjust the machine for stopping the division operation after each ordinal quotient is completed. Lever 340 is pivoted to the framework of the machine at 341 and the upper end of the lever projects through a slot 343 in the keyboard cover to permit manual adjustment thereof. A torsion spring 342 urges lever 340 clockwise against the rightmost end of the slot in the cover. When the stop key 985 is depressed an offset 966 in the keystem lies opposite a notch 344 formed in the lower end of the latch lever 340, so that upon counterclockwise movement of lever 340 the notch 344 overlies the offset 966, thereby locking the stop key in depressed position. When it is desired to release the stop key, the latter is merely depressed a slight amount to relieve the pressure on the locking lever 340 at which time the spring 342 returns the locking lever to its initial clockwise position shown. This removes the restraint from the stop key which then may arise to its initial position, and the machine is then in condition to perform plural order division operations.

Reverting now to the conversion operation, the octal or binary value to be converted is entered into the keyboard 100 (Fig. 1) with such entry starting with the extreme left order of the keyboard. The carriage is shifted to its right end position and the value in the keyboard is then transferred into the leftmost orders of register 500 by depression of the plus bar 800. The octal point of the value entered in register 500 is indicated by flipping over the proper ordinal marker 286. Then, the upper dial clear key 1910 is depressed to reset the counter register to zero. The operator then selects from column 3 of the conversion table the largest octal number which is contained in the value to the left of the octal point indicator 286 in the register 500 and enters this value into the keyboard starting with the extreme left order of the keyboard.

The operator then notes whether or not the octal point of the keyboard value is aligned with the octal point indicator 286 in register 500 and if such is the case the division operation may proceed, whereas if the octal point in the keyboard value is not aligned with the octal point indicator 286, then the register 500 must be properly shifted to cause such alignment before starting the division operation. For example, if the octal number to be converted is 1800.1, then the largest octal value to be found in column 3 which is contained in 1800.1 is 1750 and the octal points will line up without requiring any carriage shift. On the other hand, if the octal value to be converted is 100,000, for example, then the largest octal value which is contained therein is 23420, which includes one less digit than the value to be converted and therefore a one step of leftward carriage shift is required to effect line-up of the octal points.

After the dividend and divisor values are thus entered and lined up, the division stop key 985 is depressed and locked in depressed position by moving lever 340 to its forward position, after which the divide key 970 is depressed to initiate a single order division operation. At the conclusion of the first ordinal division operation, the machine stops and the first (highest order) quotient digit appears in the quotient register 700 directly opposite the arrow 702 marked on the stationary cover of the machine.

After the first quotient digit is completed the machine automatically comes to rest with the remainder appearing in register 500, and the operator shifts the carriage 250 one order toward the left by depressing the left shift key 1406.

The keyboard is then cleared by depressing the keyboard clear key 122, and the above procedure is repeated in each order with the divisor values being taken from successive lines in column 3 for each consecutive ordinal division operation. The next figure in column 3, for example, is 1750 which is entered in the keyboard commencing with the leftmost order of the keyboard and the operations described above are repeated until a fractional divisor value is reached, in which case the first significant digit of such fractional divisor is entered, commencing with the next to the leftmost order of the keyboard, all in accordance with the procedure previously described.

If each of the successive quotient digits is a significant digit no alignment of the octal points is required after the initial quotient digit, and the above rule of entering successive divisors from column 3 is followed. If, however, one or more zeros occur in the quotient, division in these orders may be omitted by shifting the carriage to line up the octal points for the next ordinal division operation, and the divisor value is selected in accordance with the rule of choosing from column 3 the largest value contained within the remainder of the dividend. This sequence of operations is repeated from order to order for as many quotient places as is desired at which time the decimal equivalent of the converted octal or binary value appears in the quotient register 700.

I claim:

1. In a calculating machine having a keyboard, an accumulator register, differential actuators controlled by the keyboard to actuate said register, and a counter register; the combination of, numeral wheels in the accumulator register each having eight indicating positions and actuated selected amounts by said actuators, and carry-over mechanism between said numeral wheels operable in the octal system and effective upon movement of a numeral wheel through eight digital units to move the next higher order numeral wheel one digital unit, with numeral wheels in the counter register each having ten indicating positions, and tens carry mechanism between said counter numeral wheels operable in the decimal system and effective upon movement of the numeral wheel through ten digital units to move the next higher order numeral wheel one digital unit.

2. In a calculating machine having a keyboard, an accumulator register, and cyclically operable actuators controlled by the keyboard to actuate said register; the combination of, numeral wheels in the accumulator register each having eight indicating positions and cyclically operable through a selected number of octal units during each cycle of operation thereof by said actuators, and carry-over mechanism between said numeral wheels operable in the octal system and effective upon movement of a numeral wheel through eight octal units to move the next higher order numeral wheel one octal unit, with division mechanism controlled by the numeral wheels of said accumulator register to control the cyclic operation of said actuators, and a counter register operable to count in the decimal system of numeration the cyclic operation of the numeral wheels of the accumulator register.

3. In a calculating machine having a keyboard, an accumulator register, and cyclically operable actuators controlled by the keyboard to actuate said register; the combination of, numeral wheels in the accumulator register each having eight indicating positions and cyclically operable through a selected number of octal units during each cycle of operation thereof by said actuators, and carry-over mechanism between said numeral wheels effective upon movement of a numeral wheel through eight octal units to move the next higher numeral wheel one octal unit, with division mechanism controlled by the numeral wheels of said accumulator register to control the cyclic operation of said actuators, a counter register including numeral wheels each having ten indicating positions and tens carry mechanism between said numeral wheels effective upon movement of a numeral wheel through ten units of the decimal system to move the next higher order numeral wheel one such unit, and a counter actuator operable in timed relation to said differential actuators to drive said counter register and to cause the latter register to count in the decimal system of numeration the cyclic operation of the numeral wheels of the accumulator register.

4. In a calculating machine having a plural order multiplier register operable in a first radix, actuating mechanism for said multiplier register, and multiplier value entering mechanism; the combination of a plural order product register operable in a second radix, actuating mechanism for said product register, and value entry means for adjusting said product register actuating mechanism in accordance with a selected value based upon said second radix, with drive means for the product register actuating mechanism controlled by said multiplier entering mechanism to cause the product register actuating mechanism to enter into said product register the second-radix product of the selected value times the value entered in the multiplier register.

5. The calculating machine described in claim 4 wherein the first radix is 10 and the second radix is 8.

6. In a calculating machine having an ordinally arranged keyboard comprising in each order keys representative of binary triple values, an accumulator register including numeral wheels, cyclically operable actuators controlled by the keyboard to actuate said numeral wheels in accordance with selected binary triple values, and carry-over mechanism between said numeral wheels operable upon movement of a numeral wheel through eight binary triple units to move the next higher order numeral wheel one binary triple unit, with division mechanism controlled by the numeral wheels of said accumulator register to determine the cyclic operation of said actuators, and a counter register operable to count in the decimal system of numeration the cyclic operation of said actuators.

HAROLD T. AVERY.

References Cited in the file of this patent

UNITED STATES PATENTS

| Number | Name | Date |
|---|---|---|
| 2,191,567 | Hofgaard | Feb. 27, 1940 |
| 2,222,164 | Avery | Nov. 19, 1940 |
| 2,318,591 | Couffignal | May 11, 1943 |
| 2,364,540 | Luhn | Dec. 5, 1944 |
| 2,375,332 | Torkelson | May 8, 1945 |
| 2,530,149 | Britten, Jr. | Nov. 14, 1950 |
| 2,591,007 | Rench | Apr. 1, 1952 |

OTHER REFERENCES

Giant Brains or Machines that Think, by Edmund C. Berkeley, pages 216–219, published by John Wiley & Sons, Inc., New York.